United States Patent
Burok et al.

[11] Patent Number: 6,038,302
[45] Date of Patent: Mar. 14, 2000

[54] METHODS AND APPARATUS FOR PROCESSING PHANTOM CALLS PLACED VIA COMPUTER-TELEPHONY INTEGRATION (CTI)

[75] Inventors: Didina Burok, Matawan, N.J.; Brian Hillis, Englewood, Colo.; Steven Michael Silverstein, West Long Branch, N.J.

[73] Assignee: Lucent Technologies Inc., Murray Hill, N.J.

[21] Appl. No.: 09/053,635

[22] Filed: Apr. 2, 1998

[51] Int. Cl.[7] .............................. H04M 3/42; H04M 3/50; H04M 11/00

[52] U.S. Cl. ...................... 379/201; 379/93.24; 379/265; 379/308

[58] Field of Search .............................. 379/93.17, 93.24, 379/201, 207, 265, 266, 308, 309

[56] References Cited

U.S. PATENT DOCUMENTS

| | | | |
|---|---|---|---|
| 4,488,004 | 12/1984 | Bogart et al. | 379/225 |
| 5,740,238 | 4/1998 | Flockhart et al. | 379/221 |
| 5,754,639 | 5/1998 | Flockhart et al. | 379/221 |

OTHER PUBLICATIONS

R. Walters, "What is CTI?," <http:www.ctinet.co.uk/cti-what.html>, CTInet Ltd., Jul. 1996.

*Primary Examiner*—Harry S. Hong

[57] ABSTRACT

A call initiation request generated by an application running on a computer-telephony integration (CTI) server or other CTI device is supplied via a CTI link to a switch. The switch receives the request over the CTI link, and places a "phantom" call from the originator of the call to the destination of the call. The phantom call may be representative of, for example, a real-time voice call or a non-real-time transaction such as a delivery of an e-mail, facsimile or voice mail message. The originator corresponds to a phantom extension or group of phantom extensions which is not associated with any physical communication device of the system. A phantom extension in accordance with the invention does not require an actual physical originator or destination communication device, as well as a corresponding switch port card or other hardware, and therefore does not consume valuable switch resources. The switch reports call status information for the phantom call to the application over the CTI link.

20 Claims, 4 Drawing Sheets

METHODS AND APPARATUS FOR PROCESSING PHANTOM CALLS PLACED VIA COMPUTER-TELEPHONY INTEGRATION (CTI)

FIELD OF THE INVENTION

The invention relates generally to call processing in communication systems, and more particularly to systems in which calls or other incoming communications are directed by a switch to wired desksets, wireless desksets and handsets, personal computers or other types of user terminals within the system.

BACKGROUND OF THE INVENTION

Call centers and other types of call processing systems are evolving into customer contact centers handling service requests arriving over a variety of media. Such contact centers typically handle more than just incoming real-time voice calls. For example, these customer contact centers may handle other real-time service requests, such as video calls and multimedia calls, as well as non-real-time service requests, such as e-mail, fax, and voice messages. Conventional private branch exchanges (PBXs) and other types of call processing switches typically provide methods of handling calls through one or more automatic call distributor (ACD) queues, but generally do not utilize their ACDs to handle service requests other than calls.

As an example, an application external to an ACD may require identification of an available attendant in an ACD environment in which attendants handle a variety of different types of real-time and non-real-time service requests. For real-time voice calls, the ACD performs the attendant selection for handling of the next incoming call. However, non-voice service requests, which do not come through the ACD, must also identify an available attendant. An application external to the ACD generally cannot perform such selection for two reasons: (1) the application is unaware of the attendant's state, and (2) even if the application knew the state, there would be contention between the application and the ACD. Some have attempted to solve this problem by allowing the ACD to perform the attendant selection. This is implemented by placing a large number of telephones coupled to the switch in a "closet," and utilizing those closeted telephones to place calls to the ACD via a computer-telephony integration (CTI) application. Such an arrangement allows a CTI application to enhance the functionality of a conventional PBX by using the telephony model. However, this arrangement is expensive due to the cost of the telephones, the corresponding switch port cards and other supporting hardware, and generally consumes substantial switch resources such as, for example, time slots, tone generators and tone detectors. These switch resources are then unavailable for use in processing voice calls and other real-time service requests.

SUMMARY OF THE INVENTION

The invention solves the above-noted problem and other problems of conventional systems by providing improved call processing in a CTI environment. In particular, the invention removes the need for closeted telephones. In an illustrative embodiment, a call initiation request generated by a CTI application is supplied via a CTI link to the switch. The switch receives the call initiation request over the CTI link, and places a "phantom" call from an originator to a destination. The originator corresponds to a phantom extension which is not associated with a telephone or other physical communication device of the system. Alternatively, the originator may correspond to a group of phantom extensions. The destination may be a phantom extension, a group of phantom extensions, any type of conventional extension or a telephone number external to the switch. The phantom call does not require an actual physical communication device, and the corresponding switch resources, for either the originator, the destination or both. The switch reports call status information for the phantom call to the application over the CTI link. The invention utilizes CTI capabilities to allow applications to be coupled to switch functions such as automatic call distributors (ACDs) and other switch voice features.

A wide variety of applications can benefit from the use of phantom calls in accordance with the invention. One possibility is CTI applications that need to identify an available attendant. For example, a phantom call may be generated in response to a non-real-time service request, such as delivery of an e-mail message to an attendant. The phantom call is placed in an ACD queue, and when an attendant becomes available, the phantom call is delivered to that attendant. The attendant may then hear a message such as "You have e-mail to process" upon answering the phantom call, and the corresponding e-mail information will be displayed on the attendant terminal in a format controlled by the application which requested the phantom call. The invention thus allows a customer contact center to automate the flow of service requests to attendants in an efficient manner, mixing the delivery of non-real-time requests with real-time requests and allowing the same mechanisms for routing, queuing, delivery, billing and call management to be used for both types of requests. This maximizes the productivity of the attendants, while providing a high level of customer service for all requests. The performance of the phantom call can be monitored by standard switch measurements, such as call attempts, call completions, call duration, etc. Although the full switch measurement capabilities can be used to track such a phantom call, the switch resources utilized are minimal.

Another use for phantom calls is CTI applications that perform call control functions such as conference and transfer. For example, phantom calls may be used to provide automated setup for conferencing multiple parties into a single call at a specified time. A CTI application first initiates the phantom call to one of the conferees. When that conferee answers, the CTI application puts the first call on hold and initiates another phantom call to the next conferee, then conferences them together. This process repeats until all the conferees are on the call. Other applications of phantom calls in accordance with the invention include, for example, delivery of retrieved web pages, multimedia call handling, automatic system login, predictive dialing, switch maintenance and security functions, mass notification, and selection of calls from a queue.

The invention provides a number of advantages over conventional techniques. For example, the invention improves the efficiency of attendants that handle multiple types of service requests, e.g., real-time voice calls and non-real-time service requests such as e-mail, facsimile, voice messages or real-time text chatting. The invention allows more efficient use of switch resources, in that phantom extensions do not utilize physical ports, time slots, tone detectors, tone generators and other types of physical switch hardware. The invention also allows new functionality which would otherwise not be available in conventional systems. In addition, by eliminating the need for certain physical communication devices and corresponding hardware, the invention can result in a substantial cost savings. Moreover, the invention can make use of exiting switch measurement capabilities to monitor phantom calls and therefore the corresponding attendant work activity. When a call is placed to or from a phantom extension, all existing switch traffic measurements are preserved. These and other features and advantages of the present invention will become more apparent from the accompanying drawings and the following detailed description.

DETAILED DESCRIPTION OF THE INVENTION

Although the invention will be illustrated below in conjunction with an exemplary call processing system, it is not limited to use with customer contact centers or any other particular type of system. The disclosed phantom call techniques may be used in any computer-telephony integration (CTI)-based communication switching application in which it is desirable to utilize a non-physical "phantom" extension as the originator of a call. The term "switch" is intended to include any portion of a communication system which processes calls or other service requests, including voice calls, video calls, multimedia calls, e-mail, faxes, voice messages, text chatting or paging massages as well as various combinations of these and other types of communications. The term "non-real-time service request" is intended to include requests to deliver e-mail, faxes, voice messages, paging messages or any other type of communication which does not require establishment of a real-time voice connection with the destination terminal. The term "computer-telephony integration" is intended to include any processing environment that enables applications to control and monitor activity on a switch. It should be understood that a CTI device "associated with" a switch may be, for example, coupled to the switch via a CTI link, or completely or partially incorporated into the switch.

Figure 1:
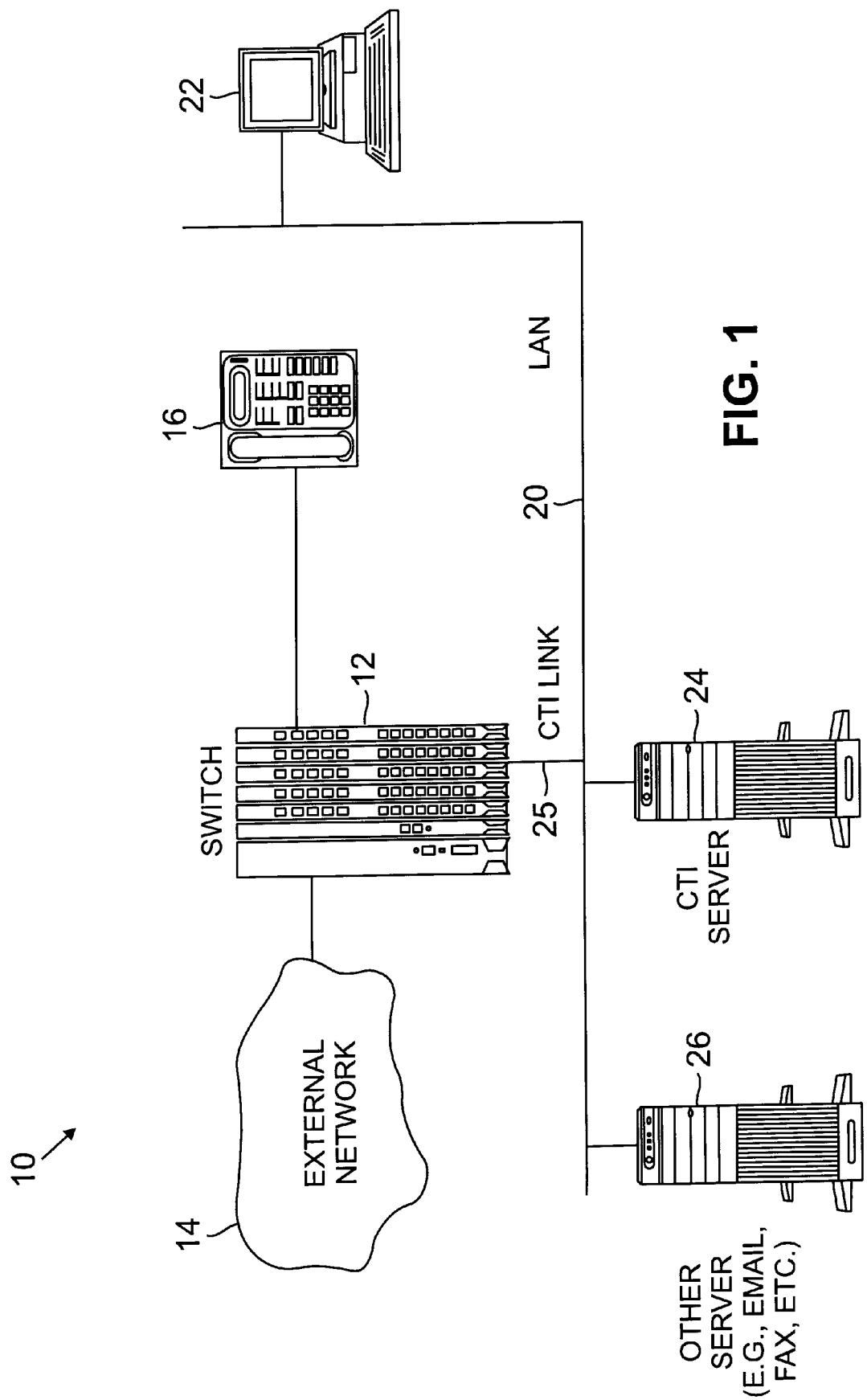
FIG. 1 shows a portion of an exemplary call processing system configured in accordance with an illustrative embodiment of the invention.

FIG. 1 shows a portion of a call processing system 10 in accordance with an illustrative embodiment of the invention. The system 10 includes an enterprise switch 12 which communicates with an external network 14 via one or more interfaces. The interfaces with external network 14 supply incoming calls and other service requests to the switch 12 for processing. The switch 12 is coupled to an exemplary wired deskset 16 as shown, and to a local area network (LAN) 20. The LAN 20 provides communications between the switch 12 and a personal computer (PC) 22, a CTI server 24, and optionally at least one other server 26. The switch 12 communicates with the LAN 20 and CTI server 24 over a corresponding CTI link 25. Such CTI links are used in many conventional call centers and office environments and allow the switching system to communicate externally with PC-based applications. The server 26 will be referred to herein as an application server, and is used to provide support for various applications, including, for example, non-real-time service requests such as e-mail, faxes and so on. It should be noted that although shown in FIG. 1 as separate from the switch 12, the CTI server 24 may be completely or partially incorporated into the switch 12 in other embodiments. Moreover, the CTI link 25 need not be a physical link external to the switch 12. For example, the CTI link 25 may be a logical link internal to the switch 12 or CTI server 24.

The deskset 16 and PC 22 may be associated with one or more attendants which process incoming service requests. It should be noted that the switch 12 may be connected to a large number of other devices, such as additional wired desksets, networks, computers and servers, as well as devices such as wireless base stations, video telephones, administrative terminals and other complex terminals. These and other additional switch connections are omitted from FIG. 1 for clarity of illustration. The switch 12 may therefore support delivery of calls to and from a large number of attendants.

Figure 2:
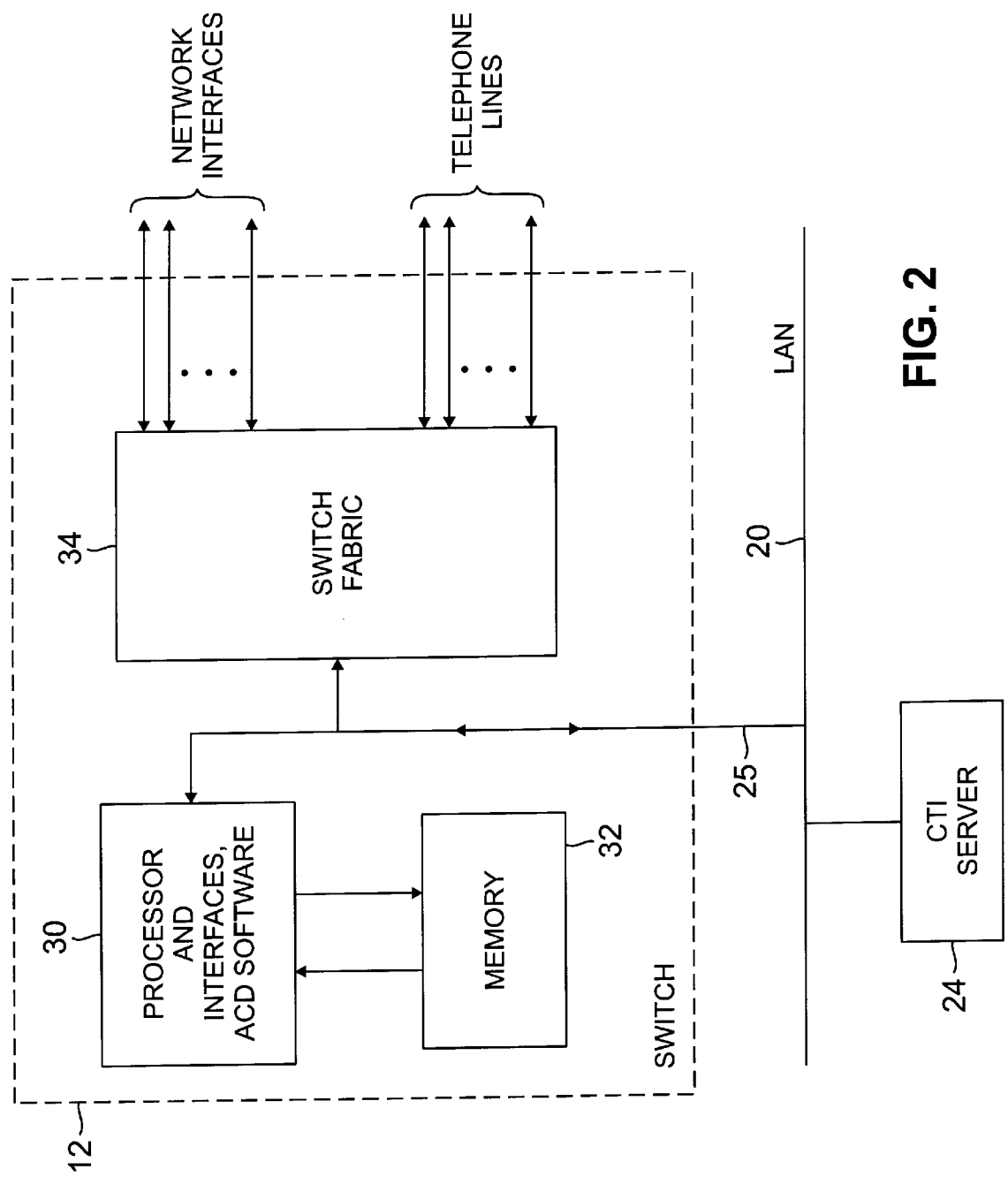
FIG. 2 is a block diagram of a switch suitable for use in the system of FIG. 1.

FIG. 2 shows one possible embodiment of switch 12 in greater detail. The switch 12 includes a processor and network interfaces element 30, a memory 32, and a switch fabric 34. The processor portion of element 30 operates in conjunction with software stored in the memory 32 to implement various switch processing functions including, for example, automatic call distributor (ACD) functions. The processor portion of element 30 may be a microprocessor, an application-specific integrated circuit (ASIC) or other type of digital data processor, as well as various portions or combination of such devices. The memory 32 may be a random access memory (RAM), a read-only memory (ROM), a disk-based memory or combinations of these and other types of electronic, magnetic or optical memory devices. The memory 32 may include, for example, a disk-based system database for storing information regarding the configuration of the switch, such as the type of desksets or other devices coupled to the switch.

The switch fabric 34 is coupled to interfaces to the external network 14, and in conjunction with ACD software implemented in element 30 distributes calls between the network interfaces and a number of telephone lines. The interfaces in element 30 provide connections such as, for example, connections with the LAN 20 and the CTI server 24. Although not shown in FIG. 2, the switch 12 will generally include port cards for supporting communications with the deskset 16, LAN 20 or any other devices coupled to ports of the switch. The port cards may be coupled between the telephone lines or network lines and the outputs of the switch fabric 34 or network interface portions of element 30, or may be implemented within these elements or elsewhere in the switch 12. As previously noted, the CTI server 24 may be completely or partially incorporated into the switch 12. For example, portions of the CTI server software may be implemented using the processor in element 30, and may communicate with an application server such as server 26 via the LAN 20.

The operation of the system 10 in processing a "phantom call" will now be described in greater detail. When an application needs to service a request, such as an e-mail, fax or voice message, it directs the CTI server 24 to initiate a process for placing a phantom call in the switch 12 to a specified destination. The term "phantom call" as used herein refers generally to a CTI-initiated call for which the originator of the call corresponds to an extension or group of extensions which is not associated with any physical communication device. For example, the switch 12 may place the call from a phantom extension to an ACD that is assigned to handle the request. If an attendant is not immediately available, the call is placed into a queue associated with the specified ACD, and remains in that queue until an attendant is identified. At that point, the phantom call is taken out of the queue by the ACD software and is delivered to the attendant. At the same time, the application is informed, via the CTI link 25, of the identity of the attendant that received the phantom call. The application simultaneously delivers pertinent information regarding the phantom call to the PC 22 over the LAN 20. The information may be presented to the attendant at the PC 22 in the form of one or more "pop-up" windows on a display screen of PC 22. An application which requests the initiation of a phantom call in the system of FIG. 1 may be running, for example, on the CTI server 24 or the application server 26.

A phantom call in accordance with the invention is different than a real-time voice call handled by the switch 12. Unlike voice calls, that generally have physical endpoints, such as a telephone or an incoming trunk line, a phantom call has a non-physical originating endpoint. For example, it may be originated from a phantom extension, i.e., an extension which is assigned but not associated with a physical port card or other physical communication device. As a result, the phantom call is placed without the need for an actual telephone or port card, and without the use of switch resources such as, for example, tone generators and tone detectors. A phantom call originated from a phantom extension can be placed to either a physical destination, such as a telephone, or to "virtual" destinations, such as other phantom extensions. The phantom call can be placed quicker, without the delays associated with a telephone or other physical devices, because there is no need to communicate and synchronize with the hardware and no need to wait for the telephone to respond (e.g., to go off-hook and dial digits). Phantom calls can therefore reduce hardware costs and consumption of switch resources while also providing improved performance in the handling of applications. This is particularly important at high volumes of transactions. Moreover, the full capabilities of the switch 12 can be exploited for routing, distributing and tracking the phantom calls. For example, phantom calls can be tracked and measured like any measured real-time voice call, because the switch 12 can implement well-known techniques for facilitating queue, attendant, and traffic measurements. Call managers can utilize the measurements to create reports based on the phantom extension which could map to specific applications.

Figure 3:
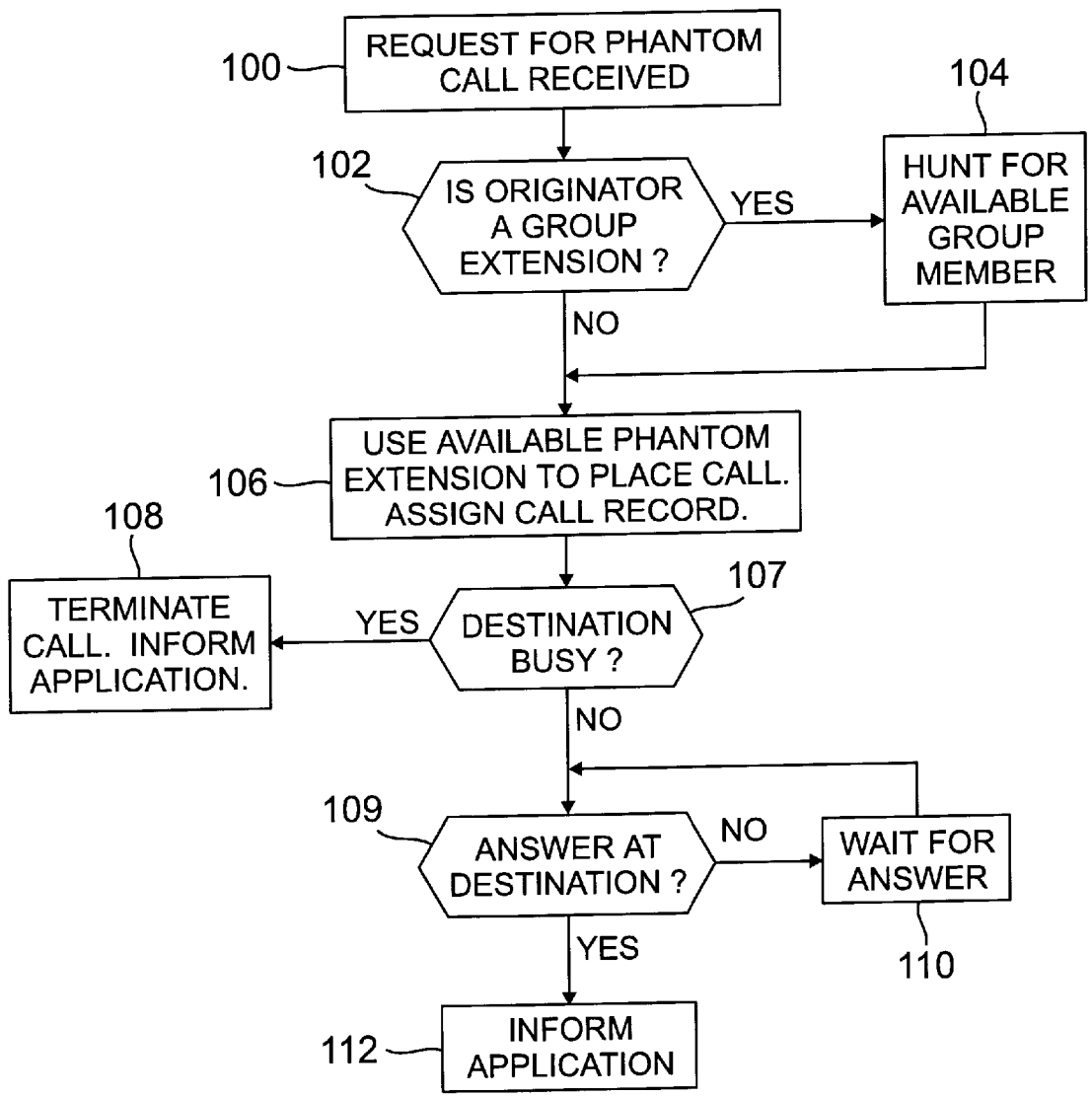
FIG. 3 is a flow diagram illustrating phantom call processing in a system configured in accordance with the invention.

FIG. 3 is a flow diagram illustrating phantom call processing in accordance with the invention. In step 100, a request for initiation of a phantom call to a specified destination is received in the switch 12. The request in this example is in the form of a message sent to the switch 12 from the CTI server 24 over the CTI link 25. The CTI server 24 may generate this message in response to a request or other stimulus from an application running, for example, on server 26. The message specifies as the originator either a phantom extension or an extension corresponding to a phantom group. The phantom extension is an individual addressable extension, and the phantom group is a group of phantom extensions. Both are based on administrative data specifying the current configuration of the switch 12. Such data may be stored in a system database associated with the switch 12.

Step 102 determines whether or not the originator extension is a group extension. If the originator extension is a group extension, the switch hunts for an available phantom group member extension in step 104. The switch in step 106 uses the identified phantom extension to place a call to the specified destination. If the originator extension is determined in step 102 to be an individual phantom extension, the process proceeds directly to step 106 and that extension is used to place the phantom call to the specified destination. In either case, an internal call record is assigned to the phantom call, and the call is placed to the specified destination. An advantage of using a hunt group extension, instead of an individual extension, is that it allows the switch to select the next available internal phantom extension and use it to place the phantom call. Without the ability to specify a hunt group extension, it might be necessary for the application which requested the phantom call to keep track of the in-use phantom extensions.

After the phantom call is placed, it may be processed as if it were a voice call placed by CTI server 24 through the CTI link 25. For example, once the call is placed and the call record assigned as shown in step 106 of FIG. 3, the switch reports over the CTI link 25 to the requesting application the particular extension used to place the phantom call. The application is also informed of the call progress, such as when the call is ringing or answered at the specified destination. Step 107 determines if the destination is busy or otherwise not accessible. If so, the switch will disconnect the call and report the outcome to the CTI application, as shown in step 108. This intelligence in the switch ensures that the call is promptly disconnected and the records adjusted effectively. If the destination is not busy, step 109 determines whether the phantom call placed in step 106 has been answered at the specified destination. If it has not been answered, the switch waits for an answer in step 110. When the phantom call is answered at the specified destination, the switch in step 112 reports to the application that the phantom call has been answered. The phantom extension used to place the call is reported by the switch in all call progress events so that the application may use this information for further call processing operations using CTI link commands issued on behalf of the specified phantom extension. For example, a call originated from a phantom extension may be placed on hold, reconnected, conferenced, transferred, dropped or otherwise processed in a manner similar to a real-time voice call.

As mentioned previously, a phantom call in accordance with the invention can be placed to a destination corresponding to another extension, group extension or a telephone number external to the switch. In such cases, the "answer" may simply be an event reported to the CTI application that understands the meaning of this action. For example, each group of phantom extensions might be assigned, by the application, to correspond to a particular type of service. Each call delivered to a phantom destination is then associated with that particular service.

A phantom call is tracked by the switch in substantially the same manner as a voice call. For example, it may be counted in traffic measurements as a call attempt and/or a call completion, and may be tracked by call management and call data recording systems. However, a phantom call in the above-described illustrative embodiment utilizes only internal call records, and does not utilize tone generators, tone detectors and other switch resources normally utilized by voice calls. Moreover, because there is no physical hardware associated with a phantom originator or destination, any messages which would normally be sent to such hardware are also not needed.

Figure 4:
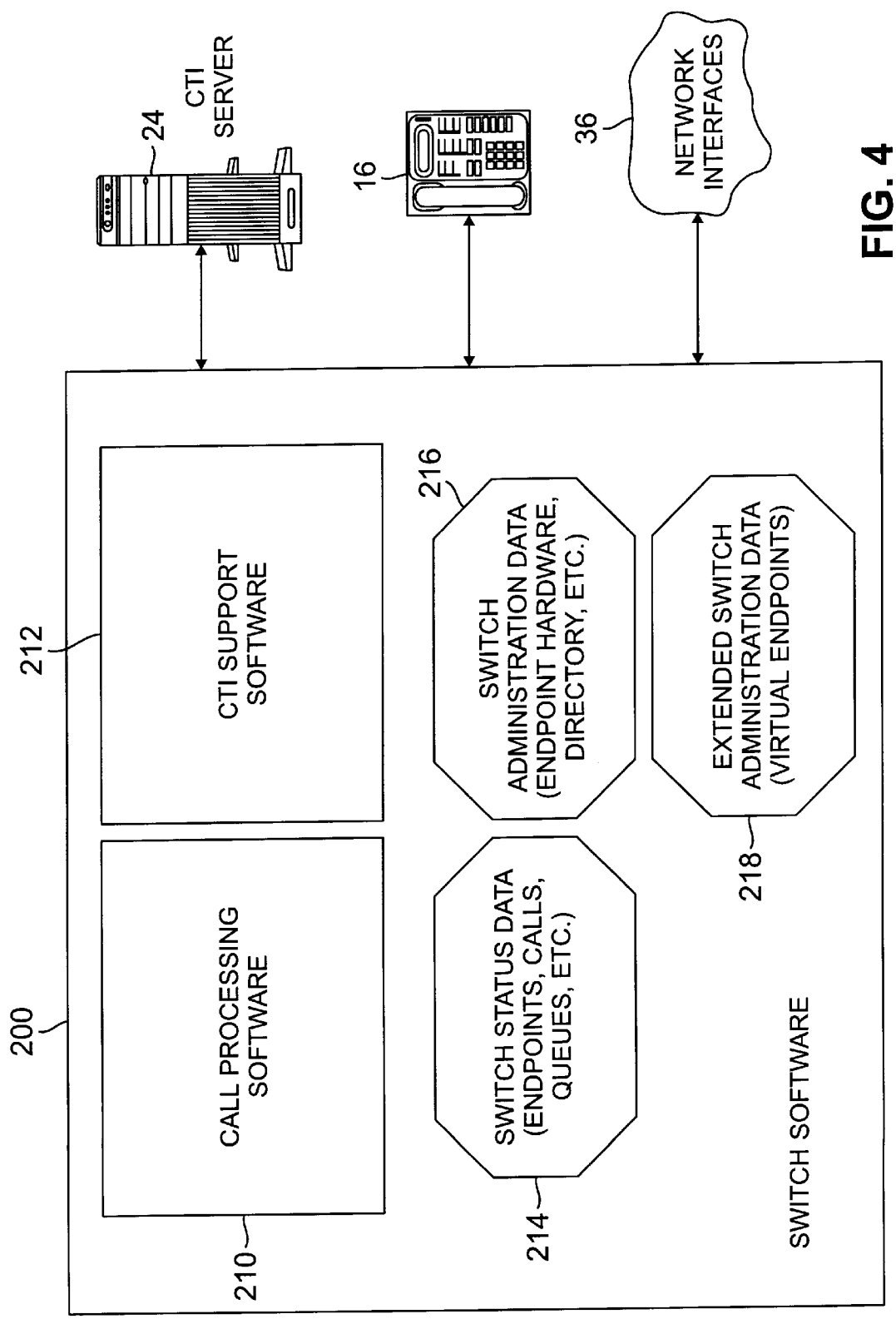
FIG. 4 is a block diagram illustrating different software elements in a switch configured in accordance with the invention.

FIG. 4 is a diagram illustrating the software which may be implemented in the switch 12 of FIGS. 1 and 2 in order to implement the above-described phantom call processing. The switch software 200 includes call processing software 210 and CTI support software 212. The call processing software 210 implements the processing functions for real-time service requests, including the functions described in conjunction with the flow diagram of FIG. 3. The CTI support software 212 controls communications between the switch 12 and the CTI server 24 over the CTI link 25. The switch software 200 also includes switch status data 214, switch administration data 216, and extended switch administration data. The switch status data 214 includes call information such as call origination and destination endpoints and ACD queue status. The switch administration data 216 includes information regarding the current configuration of the switch 12, such as the endpoint hardware coupled to various switch port cards, a directory of extensions, and the like. The extended switch administration data 218 includes information regarding "virtual" endpoints such as the above-described groups of phantom extensions.

The switch software 200 may be implemented using the processor 30 and memory 32 of the switch 12. For example, the data elements 214, 216 and 218 may be in the form of data structures maintained in memory 32 by the processor 30 in response to instructions associated with the call processing software 210 or CTI support software 212. Although shown in FIG. 4 as interacting with CTI server 24, deskset 16 and network interfaces 36, the switch software also controls and otherwise interacts with other elements of system 10 and switch 12.

The above-described phantom call processing may be utilized in numerous communication applications. For example, phantom calls in accordance with the invention may be used to implement "blended" delivery of Internet e-mail. In this application, a phantom call may be placed in an ACD queue for delivery to an attendant. When an attendant becomes available, the phantom call is delivered to that attendant. The attendant, for example, may then hear a message such as "You have e-mail to process" upon answering the phantom call, and the corresponding e-mail information will be displayed on the attendant terminal in a format controlled by the application which initiated the phantom call. The phantom call will stay connected until the attendant completes the transaction. During this time, the attendant is considered busy and the ACD will not deliver any other calls to that attendant. The performance of the phantom call can be monitored by standard switch measurements, such as call attempts, call completions, call duration, etc. The attendant performance may also be measured based on the duration of the call. Again, while the full switch measurement capabilities can be used to track such a phantom call, the switch resources utilized are minimal.

Another application of phantom calls is CTI conference control, in which a phantom call is used to conference multiple parties into a single call. The initial call can be placed from a phantom extension. Upon answer, the initial call is placed on hold and another call is placed from the phantom extension. The two calls are then conferenced together. At this point the call may be placed on hold again from the phantom extension and a new call placed and conferenced in with the original call. This process can be repeated until the maximum number of parties has been reached for a given call.

The following are a number of additional exemplary applications of phantom calls:

1. Multimedia Call Handling. A phantom call is placed to an ACD queue to identify an available attendant, the switch reports the extension of the selected attendant to the application via the CTI link, and the application then routes the remaining call components (e.g., data, video, text, etc.) to the terminal of that attendant. The application may use other call-related information reported by the switch to retrieve a web page and display it on the attendant terminal.

2. Automatic Login in Systems Requiring DTMF Tones. By placing a phantom call to a system requiring dual-tone multiple-frequency (DTMF) tones for login, and by automatically sending the DTMF tones using the CTI application, a user can be logged into such a system automatically.

3. Predictive Dialing. Phantom calls can be used to implement predictive-type dialing utilized in call centers for outbound call management. A call is placed from a phantom extension to a specified destination. A tone detector is inserted in the connection to "listen" to call progress tones. When the specified destination answers, the call is transferred to an attendant and the phantom extension is dropped out of the call.

4. Maintenance and Security Functions. Phantom calls can be used to place calls to alert various maintenance staff to abnormal switch conditions, or to alert security staff of abnormal security conditions. In environments in which a wake-up type functionality is desired, phantom calls can be used to implement wake-up calls.

5. Mass Notification. Phantom calls can be used in business environments where notification to multiple users requires calling everyone and providing notification of emergency or non-emergency events.

6. Any technique for selecting transactions to be processed, in which the transactions are represented as calls in a queue. This could be accomplished by an attendant selecting which transaction is to be processed next, and the CTI application using a phantom extension to transfer the corresponding call out of the queue to the attendant.

The above-described embodiments of the invention are intended to be illustrative only. The exemplary configuration of system 10 of FIG. 1 and switch 12 of FIG. 2 may be altered to incorporate a wide variety of different arrangements of components to provide the phantom call processing functions described herein. In one possible alternative embodiment, a call processing switch may be configured to allow system resources to be added after a phantom call has been directed to an attendant. For example, a voice message playback device may be attached to the call, or a two-way voice connection may be established between the attendant and a customer. These and numerous other alternative embodiments within the scope of the following claims will be apparent to those skilled in the art.

What is claimed is:

1. A method of processing a call in a switch of a communication system, the method comprising the steps of:

receiving, from a computer-telephony integration device associated with the switch, a request to place a call through the switch from an originator to a destination; and placing the call through the switch from the originator to the destination, wherein the originator corresponds to an extension which is not associated with a physical communication device of the system.

2. The method of claim 1 further including the step of determining a disposition of the call.

3. The method of claim 1 wherein the originator corresponds to a single extension which is not associated with a physical communication device of the system.

4. The method of claim 1 wherein the originator corresponds to group of extensions each of which is not associated with a physical communication device of the system.

5. The method of claim 1 wherein the destination corresponds to a single extension which is not associated with a physical communication device of the system.

6. The method of claim 1 wherein the destination corresponds to group of extensions each of which is not associated with a physical communication device of the system.

7. The method of claim 1 wherein the call corresponds to a real-time transaction.

8. The method of claim 1 wherein the call corresponds to a non-real-time transaction including a request for delivery of at least one of an e-mail message, a fax message and a voice message to the destination.

9. The method of claim 1 wherein the receiving step includes receiving the request to place the call from a computer-telephony integration application running on the computer-telephony integration device associated with the switch.

10. The method of claim 1 wherein the step of placing the call includes the steps of:
   determining if the originator corresponds to a group of extensions;
   searching for an available extension within the group of extensions;
   placing the call using the available extension; and
   determining a disposition of the call.

11. An apparatus for use in processing a call in a communication system, the apparatus comprising:
   a switch; and
   a computer-telephony integration device associated with the switch, the device generating a request to place a call through the switch from an originator to a destination, wherein the originator corresponds to an extension which is not associated with a physical communication device of the system.

12. The apparatus of claim 11 wherein the originator corresponds to a single extension which is not associated with a physical communication device of the system.

13. The apparatus of claim 11 wherein the originator corresponds to group of extensions each of which is not associated with a physical communication device of the system.

14. The apparatus of claim 11 wherein the destination corresponds to a single extension which is not associated with a physical communication device of the system.

15. The apparatus of claim 11 wherein the destination corresponds to group of extensions each of which is not associated with a physical communication device of the system.

16. The apparatus of claim 11 wherein the call corresponds to a real-time transaction.

17. The apparatus of claim 11 wherein the call corresponds to a non-real-time transaction including a request for delivery of at least one of an e-mail message, a fax message and a voice message to the destination.

18. The apparatus of claim 11 wherein the request to place the call is generated by an application running on the computer-telephony integration device.

19. The apparatus of claim 11 wherein the computer-telephony integration device is incorporated into the switch.

20. An apparatus for use in processing a call in a communication system, the apparatus comprising:
   a processor operative to place a call from an originator to a destination using information supplied by a computer-telephony integration device associated with the processor, wherein the originator corresponds to an extension which is not associated with a physical communication device of the system; and
   a memory coupled to the processor for storing information regarding the call.

* * * * *